3,002,983
1,3,5(10)6,8-ESTRAPENTAEN-3,16β,17β TRIOL COMPOUNDS AND PROCESS
Max N. Huffman, Colorado Springs, Colo., assignor to Lasdon Foundation, Inc., Yonkers, N.Y., a corporation of Delaware
No Drawing. Filed Apr. 24, 1961, Ser. No. 104,827
7 Claims. (Cl. 260—397.45)

This invention relates to 1,3,5(10),6,8-estrapentaen-3, 16β,17β-triol compounds and the production thereof. More particularly this invention relates to compounds having the following structural formula:

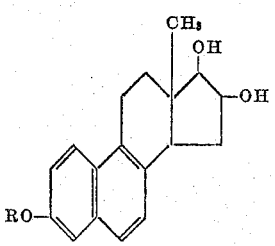

wherein R represents hydrogen or a lower aliphatic hydrocarbon radical such as methyl, ethyl, propyl, allyl, crotyl and the like.

The compounds of the foregoing general formula strongly stimulate the reticuloendothelial system of mammals. For instance, 1,3,5(10),6,8-estrapentaen-3,16β,17β-triol shows a marked antiprostatic effect in the male rate with very little loss in body weight. This compound and its methyl-ethyl and allyl ethers strongly stimulate the reticuloendothelial system of mice, while suppressing the prostate without exhibiting estrogenic activity.

The reticuloendothelial system plays an important part in cholesterol metabolism. Cholesterol-containing macromolecular aggregates appear to be phagocytosed by cells of the reticuloendothelial system. Stimulation of the reticuloendothelial system accelerates the reduction in blood cholesterol levels. It has been observed that premenopausal women are virtually immune from coronary thrombosis, and these observations led to the study of the effect of certain estrogens in experimental and clinical atherosclerosis. These studies indicate that certain estrogens cause clinical improvement as well as a reversion toward normal of the blood lipid picture in hypercholesterolemic individuals. On the basis of such studies it has been concluded that the estrogens may have a useful role in therapy or prophylaxis of disorders associated with abnormal levels of cholesterol in the blood, and that the efficacy of these substances may be due to their stimulating effect upon the reticuloendothelial system. A major limiting factor in the use of estrogens lies in their concomitant sexual effect. Therefore, it is desirable to produce steroids having an effect upon the reticuloendothelial system without undesired sexual activity.

It is an object of this invention to provide steroids which stimulate the reticuloendothelial system which have a negligible estrogenic or other sexual effect. It is another object of this invention to provide efficient methods for producing such steroids. An additional object is to provide novel steroids having antiprostatic effect in male mammals. It is a further object to provide useful 1,3,5 (10),6,8 - estrapentaen - 3,16β,17β - triol compounds and ethers thereof. These and other objects are apparent from and are achieved in accordance with the following disclosure.

The compounds of this invention are made from D-equilenin by nitrosation in the 16-position, followed by reaction of the 16-nitroso steroid with zinc and an acid to form a 16-oxo-17β-hydroxy steroid, and reduction of the latter with a metal hydride. The nitrosation reaction is conducted with an alkyl nitrite and an alkali metal salt of a tertiary alcohol, according to the procedure disclosed in the Huffman Patent No. 2,584,271. Preferred reagents are isoamyl nitrite and potassium tertiary-butoxide, the reaction being conducted at relatively low temperature (10–40° C.). After the reaction is completed, the excess of reagents is destroyed by the addition of an aliphatic ketone, such as acetone or butanone. The reaction mixture is then decomposed with water and acid and the precipitate of the 16-nitroso-17-oxo steroid isolated by filtration or similar procedure. Reduction of the 16-nitroso-17-oxo steroid to the 16-oxo-17β-hydroxy compound is accomplished by treatment with an excess of zinc metal and acid, such as dilute hydrochloric or acetic acid, as disclosed in the Huffman Patent No. 2,584,271. The reaction is conducted at approximately 100° C. under refluxing conditions. The 16-oxo-17β-hydroxy steroid is removed by conventional procedures and further reduced with an alkali metal hydride of a metal of group IIIA of the periodic table, such as sodium or potassium borohydride or lithium aluminum hydride.

The invention is disclosed more in detail by means of the following examples which are provided for purposes of illustration only and it will be readily understood by those skilled in the art that numerous modifications in equivalent materials and operating conditions can be made without departing from the invention.

EXAMPLE 1

*1,3,5(10),6,8-estrapentaen-3,16β,17β-triol*

500 mg. of d-equilenin dissolved in 23 ml. of a solution of potassium tertiary-butoxide in tertiary-butyl alcohol was treated with 0.38 ml. of isoamyl nitrite, which was added with good stirring. Stirring was continued for one hour and then 0.39 ml. of 2-butanone was added, and the mixture stirred for an additional half hour. The reaction mixture was then poured into 100 ml. of ice water and acidified with 0.6 ml. of concentrated sulfuric acid in 13 ml. of water. The precipitate of 16-nitroso- equilenin which formed when the reaction mixture was refrigerated overnight was removed by filtration, washed well with water and dried.

The 16-nitrosoequilenin was dissolved in 27 ml. of 67% acetic acid and to the solution was added 1.2 grams of zinc dust and 9 ml. of water. The resulting mixture was refluxed for 2.5 hours and then filtered through glass wool and the latter washed with 10 ml. of 50% acetic acid. The filtrate was refrigerated and the precipitate of 1,3,5(10),6,8-estrapentaen-3,17β-diol-16-one was removed by filtration, washed well with water and dried at room temperature. A yield of 325 mg. was obtained.

The 1,3,5(10),6,8-estrapentaen-3,17β-diol-16-one was added to a solution of 0.125 gram of potassium borohydride in 150 ml. of 0.5 N potassium hydroxide solution. The mixture was agitated for one hour at room temperature and then treated with 0.75 ml. of acetone to decompose excess reagent. Then 3.5 grams of sodium sulfate was added and the solution was neutralized with carbon dioxide. A precipitate of 1,3,5(10),6,8-estrapentaen-3, 16β,17β-triol formed which was removed by filtration and washed with water. After recrystallization from aqueous methanol, the product melted at 298–300° C.

EXAMPLE 2

*3-methoxy-1,3,5(10),6,8-estrapentaen-16β,17β-diol*

475 mg. of equilenin methyl ether was nitrosated in 20 ml. of potassium tertiary-butoxide solution in tertiary butyl alcohol with 0.35 ml. of isoamyl nitrite. The mixture was stirred at room temperature for one hour, then treated with 0.36 ml. of 2-butanone, followed by 100 ml. of ice water and sufficient dilute sulfuric acid to acidify the solution. After chilling for one hour in the refrigerator, the precipitate of 16-nitrosoequilenin methyl ether was collected on a filter and washed well with water.

The 16-nitrosoequilenin methyl ether was dissolved in 24 ml. of 67% acetic acid and treated with 1.1 gram of zinc dust and 8 ml. of water. The mixture was refluxed for two hours, during which time 3-methoxy-1,3,5(10), 6,8-estrapentaen-17β-ol-16-one precipitated. An additional 48 ml. of 50% acetic acid was added to dissolve the steroid. The resulting solution was filtered through glass wool and the latter was rinsed with 32 ml. of 50% acetic acid. The filtrate was diluted with 50 ml. of water and refrigerated. A precipitate of 3-methoxy-1,3,5(10), 6,8-estrapentaen-17β-ol-16-one was removed by the filtration, washed with water and dried at 40° C. Yield: 385 mg.

The 3 - methoxy - 1,3,5(10),6,8 - estrapentaen - 17 - ol-16-one was dissolved in 100 ml. of methanol and added at room temperature to a solution of 0.14 gram of potassium borohydride in 25 ml. of 1.0 N potassium hydroxide solution. After one hour at room temperature, the mixture was heated on a steam bath, diluted with 10 ml. of water and evaporiated until crystallization began. The mixture was refrigerated and the precipitate of 3-methoxy - 1,3,5(10),6,8 - estrapentaen - 16β,17β - diol was removed by filtration, washed with water and dried. Yield: 370 mg. After recrystallization from aqueous methanol it had a melting point of 215–216° C.

EXAMPLE 3

3-ethoxy-1,3,5(10),6,8-estrapentaen-16β,17β-diol

Equilenin ethyl ether was prepared from one gram of equilenin, 10 grams of potassium carbonate, 25 ml. of diethyl sulfate and 100 ml. of 90% ethanol at reflux temperature. After 30 minutes an additional 35 ml. of diethyl sulfate was added with 15 grams of potassium carbonate. After one hour of refluxing, the mixture was diluted with 250 ml. of water, refrigerated and the precipitate of equilenin ethyl ether was removed and recrystallized from a mixture of methanol and acetone. The product had a melting point of 187.5–188° C.

A solution of 500 mg. of equilenin ethyl ether, 100 ml. of a solution of potassium tertiary-butoxide in tertiary-butyl alcohol and 0.7 ml. of isoamyl nitrite were stirred for 1½ hours at room temperature. Then a solution of 7.5 g. of glycine in 90 ml. of water was added and the stirring continued for 15 minutes. The reaction mixture was adjusted to pH 3 with dilute sulfuric acid and allowed to stand four hours. The precipitate of 16-nitrosoequilenin ethyl ether was collected on a filter, washed with water and dried.

The 16-nitrosoequilenin ethyl ether was dissolved in 75 ml. of 67% acetic acid and treated with 2.4 grams of zinc dust and 25 ml. of water. The mixture was refluxed for 2.5 hours, filtered through glass wool and the latter washed with 30 ml. of 50% acetic acid. The filtrate was diluted with sufficient water to precipitate the steroid and the mixture was refrigerated. The precipitate of 3-ethoxy-1,3,5(10),6,8-estrapentaen-17β-ol-16-one was removed by filtration, washed with water and dried.

The 3-ethoxy - 1,3,5(10),6,8-estrapentaen - 17β - ol - 16-one was dissolved in 200 ml. of absolute ethanol and the solution was chilled in an ice bath and treated with 400 mg. of potassium borohydride. The mixture was agitated at ice temperature for one hour, then allowed to stand at room temperature for four hours. Then 300 ml. of ice water containing 10 ml. of acetone was added and the mixture was allowed to stand for 15 minutes. Then two liters of cold saturated sodium chloride solution was added and the mixture refrigerated. The steroid was extracted with 1500 ml. of ethyl ether and the ether extract was washed twice with 600 ml. portions of water and dried. The ether was evaporated on the steam bath and the residue (600 mg.) of 3-ethoxy-1,3,5(10),6,8-estrapentaen-16β,17β-diol was recrystallized from aqueous methanol. The product had a melting point of 199.5–200° C.

EXAMPLE 4

1,3,5(10),6,8-estrapentaen-3,16β,17β-triol-3-allyl ether

Equilenin allyl ether was produced by refluxing a solution of 750 mg. of equilenin in 75 ml. of 90% ethanol with 7.5 grams of anhydrous potassium carbonate for ten minutes, followed by the addition of 2.6 ml. of allyl bromide and reflux for thirty minutes. An additional 2.5 ml. of allyl bromide was added and refluxing continued for 30 minutes longer. Then 75 ml. of water was added and the solution evaporated to crystallization. The solution was chilled and the precipitate of equilenin allyl ether was separated, washed with water and recrystallized from aqueous methanol. Yield: 775 mg. Melting point: 130–132° C.

775 mg. of equilenin allyl ether was dissolved in 31 ml. of potassium tertiary-butoxide solution in tertiary butyl alcohol. Then 0.48 ml. of isoamyl nitrite was added and the mixture stirred at room temperature for one hour after complete solution of reagents. Finally, 0.35 ml. of 2-butanone was added and the mixture stirred for 15 minutes. It was diluted with 160 ml. of ice water and was acidified with dilute sulfuric acid. Upon refrigeration, a precipitate of 16-nitroso-equilenin allyl ether formed. This was removed, washed with water and dissolved in 75 ml. of 50% acetic acid. To this solution was added 1.8 grams of zinc dust and the mixture refluxed for two hours. The solution was filtered through glass wool and the latter washed with 10 ml. of 50% acetic acid. The filtrate was diluted with 150 ml. of water and refrigerated. The precipitate of 1,3,5(10),6,8-estrapentaen-3-17β-diol-16-one-3-allyl ether was separated, washed with water and dissolved in 100 ml. of absolute methanol. To this solution was added 5 ml. of 1.0 N potassium hydroxide solution and 0.16 gram of potassium boro-hydride dissolved in 10 ml. of 1.0 N potassium hydroxide solution. The mixture was allowed to stand at room temperature for one hour and then treated with 25 ml. of water and evaporated until turbidity occurred. An additional 25 ml. of water was added and the mixture was refrigerated. The precipitate of 1,3,5(10),6,8 - estrapentaen - 3,16β,17β - triol - 3 - allyl ether was removed by filtration, washed with water and dried. Yield: 508 mg. After recrystallization from aqueous methanol, the compound had a melting point of 173–174° C.

What is claimed as new and desired to be secured by Letters Patent of the United States is:

1. A steroid of the formula

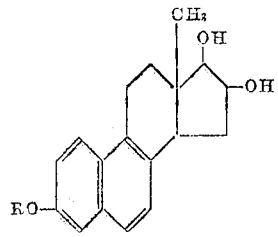

where R is a member of the group consisting of hydrogen and lower alkyl and alkenyl radicals.

2. 1,3,5(10),6,8-estrapentaen-3,16β,17β-triol.
3. 1,3,5(10),6,8 - estrapentaen - 3,16β,17β-triol - 3-allyl ether.
4. 3-methoxy-1,3,5(10),6,8-estrapentaen-16β,17β-diol.
5. 3-ethoxy-1,3,5(10),6,8-estrapentaen-16β,17β-diol.
6. Method of producing a steroid as defined by claim 1 which comprises nitrosating a steroid selected from the group consisting of equilenin and lower alkyl and alkenyl ethers thereof with an alkyl nitrite and an alkali metal tertiary-alkoxide to produce a 16-nitroso steroid, reacting the 16-nitroso steroid with zinc and acid to form a 17β-hydroxy-16-oxo steroid, and reducing the latter with an alkali metal hydride of a metal of Group IIIA of the Periodic Table to a 16β,17β-dihydroxy steroid.

7. 1,3,5(10),6,8-estrapentaen-3-ol-17-one allyl ether.

No references cited.